(12) United States Patent
Pinarbasi

(10) Patent No.: US 7,259,941 B2
(45) Date of Patent: Aug. 21, 2007

(54) MAGNETORESISTIVE SENSOR HAVING A HIGH COERCIVITY HARD BIAS STRUCTURE

(75) Inventor: Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 381 days.

(21) Appl. No.: 10/975,175

(22) Filed: Oct. 27, 2004

(65) Prior Publication Data
US 2006/0087772 A1    Apr. 27, 2006

(51) Int. Cl.
    *G11B 5/39* (2006.01)
(52) U.S. Cl. .................................. 360/324.12
(58) Field of Classification Search ........... 360/324.12, 360/327.23
See application file for complete search history.

(56) References Cited

U.S. PATENT DOCUMENTS

| | | | |
|---|---|---|---|
| 6,636,400 B2 * | 10/2003 | Pinarbasi et al. ...... | 360/324.12 |
| 6,723,450 B2 | 4/2004 | Do et al. ................. | 428/828 |
| 6,753,101 B1 | 6/2004 | Abarra et al. ............ | 428/8 |
| 6,756,136 B1 | 6/2004 | Harkness, IV et al. .... | 428/831 |
| 2002/0024778 A1 | 2/2002 | Xue et al. ............... | 360/324.1 |
| 2002/0181171 A1 | 12/2002 | Chien et al. ............ | 360/324.12 |
| 2004/0145836 A1 * | 7/2004 | Kojima et al. .......... | 360/324.12 |
| 2005/0024784 A1 * | 2/2005 | Gill et al. ............... | 360/323 |

* cited by examiner

*Primary Examiner*—Julie Anne Watko
(74) *Attorney, Agent, or Firm*—Zilka-Kotab, PC

(57) ABSTRACT

A magnetoresistive sensor having a hard bias structure having increased coercivity and squareness. The structure also allows the use of a thinner seed layer, which results in improved biasing by decreasing the spacing between the hard magnetic bias layer and the free layer of the sensor. The hard bias structure can be deposited over either a crystalline structure or over an amorphous material. The hard bias structure includes a hard bias material comprising CoPt deposited over a seed layer including a layer of NiTa and a layer of CrMo.

17 Claims, 5 Drawing Sheets

MAGNETORESISTIVE SENSOR HAVING A HIGH COERCIVITY HARD BIAS STRUCTURE

FIELD OF THE INVENTION

The present invention relates to free layer biasing in a magnetoresistive sensor, and more particularly to a hard bias structure having increased coercivity that can be used with a thinner seed layer. The structure can be deposited over crystalline or amorphous surfaces.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk and when the disk rotates, air adjacent to the surface of the disk moves along with the disk. The slider flies on this moving air at a very low elevation (fly height) over the surface of the disk. This fly height is on the order of Angstroms. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. This sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is biased parallel to the ABS, but is free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetic moments of the ferromagnetic layers of the pinned layer. A spin valve is also known as a top or bottom spin valve depending upon whether the pinning layer is at the top (formed after the free layer) or at the bottom (before the free layer).

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetic moment, when exchange coupled with a magnetic material, it can strongly pin the magnetization of the ferromagnetic layer.

The free layer is biased by a hard magnets constructed as layers of high magnetic coercivity material formed at each lateral side of the sensor. Magnetostatic coupling between each hard bias layer and the free layer biases the magnetic moment of the free layer in a direction parallel to the ABS as desired, but allows the magnetic moment of the free layer to rotate in the presence of a field that is sufficiently strong to overcome the biasing. As sensor are made ever smaller, the free layers become less stable and more difficult to bias. The hard bias structures that have been used can not provide sufficient magnetic moment to bias and stabilize the free layers of future generation sensors. This problem is made worse when combined with partial mill designs which are needed to reduce gap height. The necessity for such partial mill designs and the challenges that they present to free layer biasing are described as follows.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

As those skilled in the art will appreciate, the distance between the shields (gap thickness) determines the bit length for the read sensor. With the ever increasing pressure to increase data capacity and data rate, engineers are constantly under pressure to decrease the bit length (and therefore gap thickness) of read sensors. One way to decrease this gap thickness is by a partial mill process. Sensors have traditionally been constructed by depositing sensor layers as full film layers onto the first gap layer. A photoresist mask is then formed over the area that is to be the sensor and a material removal process such as ion milling is performed to remove material from the areas not covered by the mask. This material removal process has traditionally been performed down into the first gap layer, removing a portion of the first gap material at either side of the sensor.

Since this material removal process removes a portion of the first gap layer, it has been necessary to deposit a thick first gap layer in order prevent electrical shorts through the gap to the first shield. Such a short would be a catastrophic event that would render the sensor unusable. In these prior art heads, hard bias layers, constructed of a hard magnetic material such as CoPtCr have then been deposited over this etched out portion of the first gap layer at either side of the sensor to provide magnetic biasing to bias the magnetic moment of the free layer in the desired direction parallel with the ABS.

As discussed above, the removal of a portion of the first gap during formation of the sensor requires a larger overall gap thickness to prevent shorting. One way to overcome this is to use a partial mill process in which the material removal process (ie. ion milling) used to construct the sensor is terminated before all of the sensor material has been removed, such as when the material removal process has reached a point around the AFM layer (usually PtMn) near the bottom of the sensor. By stopping the milling process within the sensor layers, such as at the AFM layer no gap material is removed. This allows a much thinner gap to be deposited. The bias layers are then deposited on top of the remaining sensor layer rather than on the gap layer.

A problem that arises from such partial milling is that the bias layer properties are different when deposited over the AFM layer or other sensor layer than they are when deposited over the gap layer. The gap layer, usually $Al_2O_3$ is amorphous. It therefore has no crystalline structure to impart to the seed layer or to the hard bias material when the material is deposited onto the gap. Therefore, a hard bias structure deposited over the amorphous gap layer can exhibit a desired epitaxial growth that provides desired high retentive moment and high coercivity needed for free layer biasing.

However, the AFM layer, such as for example PtMn, as well as other sensor layers are not amorphous and exhibit their own grain structures. When the hard bias layers are deposited over the AFM layer, the grain structure of the underlying AFM layer carries through to the seed layer and hard bias layers. This grain structure being undesirable for optimal hard bias properties results in degraded biasing properties. This leads to free layer instability and associated signal noise. For example, depositing a CoPtCr hard magnetic material with a Cr seed layer over a PtMn substrate results in a CoPtCr hard bias layer with a coercivity of only around 600 Oe. This is much lower than the roughly 1400 Oe coercivity obtained when the same hard bias layer and seed are deposited on a glass (amorphous) substrate.

Another challenge to free layer biasing comes from the necessity to apply a relatively thick seed layer under the hard bias layer. In order to achieve the desired magnetic properties in the hard bias layers, a seed layer must first be deposited. This seed layer covers the sides of the sensor, and defines the separation between hard bias layer and the free layer. Since the magnetostatic coupling provided by the hard bias layers drops off nearly exponentially with increased distance between the hard bias layer and the free layer, any increase in seed layer thickness dramatically affects free layer efficiency.

Therefore there is a strong felt need for a hard bias structure that can provide increased biasing for a magnetoresistive sensor. Such a bias structure must provide increased biasing and improved magnetostatic coupling between the bias layers and the free layer. Such a bias structure should also capable of being deposited over a crystalline structure such as an AFM material or other sensor material while still exhibiting the necessary hard magnetic properties needed for effective free layer biasing.

SUMMARY OF THE INVENTION

The present invention provides a magnetoresistive sensor having improved free layer biasing. The sensor has first and second bias layers formed at either side of the sensor that include a seed layer and a layer of CoPt deposited on the seed layer. The seed layer may be a layer of NiTa, preferably having a thickness of 5-15 Angstroms and a layer of CrMo, preferably having a thickness of 25-35 Angstroms.

The CoPt hard bias layer has a greatly increased magnetic moment over prior art bias layers, such as CoPtCr. In fact the CoPt hard bias layer of the present invention exhibits a magnetic moment of 2000 Oe, a 30% improvement over prior art hard bias layers such as CoPtCr.

The hard bias structure of the present invention also advantageously allows the use of much thinner seed layer, which greatly increases the magnetostatic coupling between the hard bias layers and the free layer. This increase in magnetostatic coupling greatly enhances the biasing effectiveness of the bias structure.

In addition, the bias structure of the present invention can advantageously be deposited over a crystalline or amorphous structure and exhibits the above described excellent biasing performance when deposited over either structure. The bias structure of the present invention is therefore ideally suited for use in magnetoresistive sensors having a partial mill design.

These and other advantages and features of the present invention will be apparent upon reading the following detailed description in conjunction with the Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
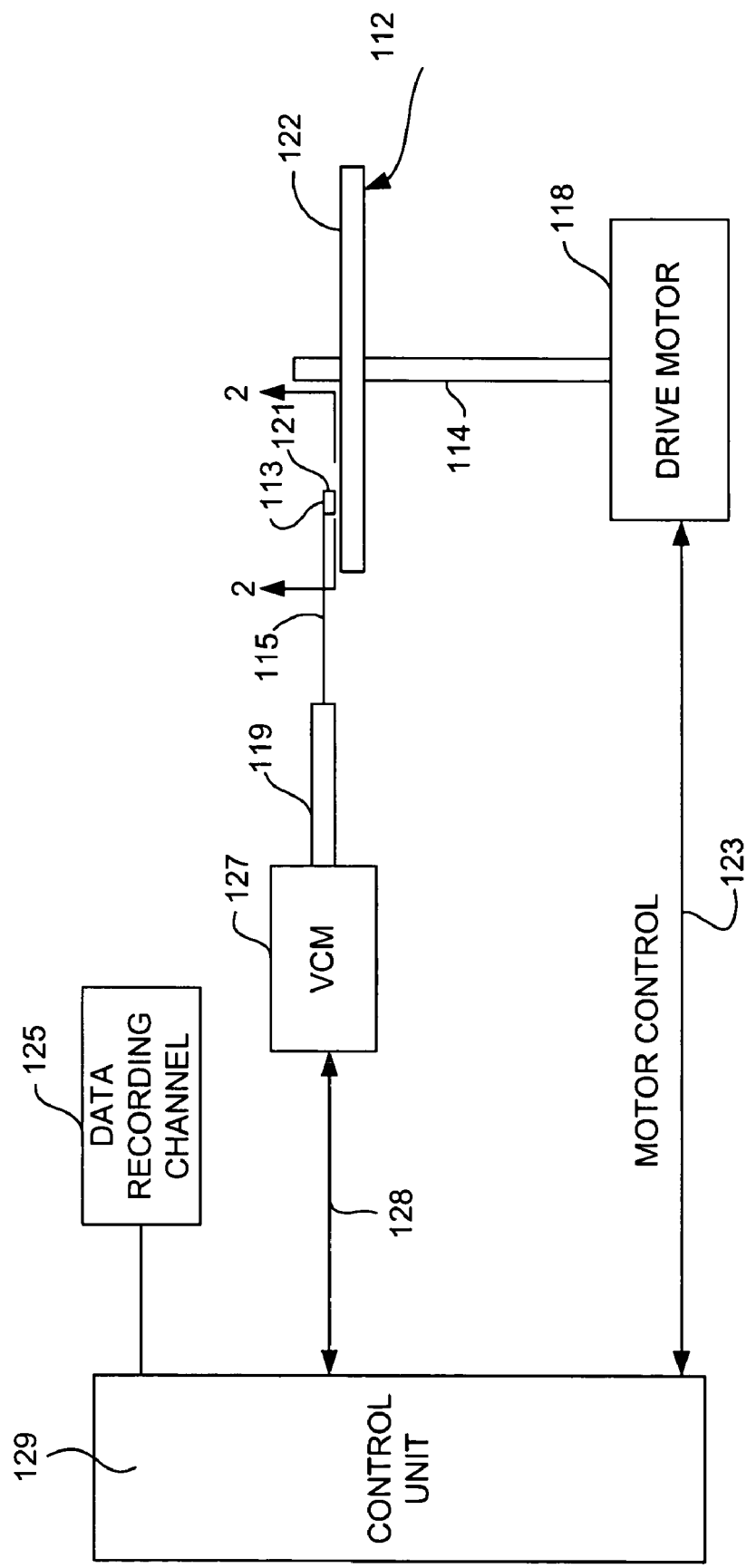
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
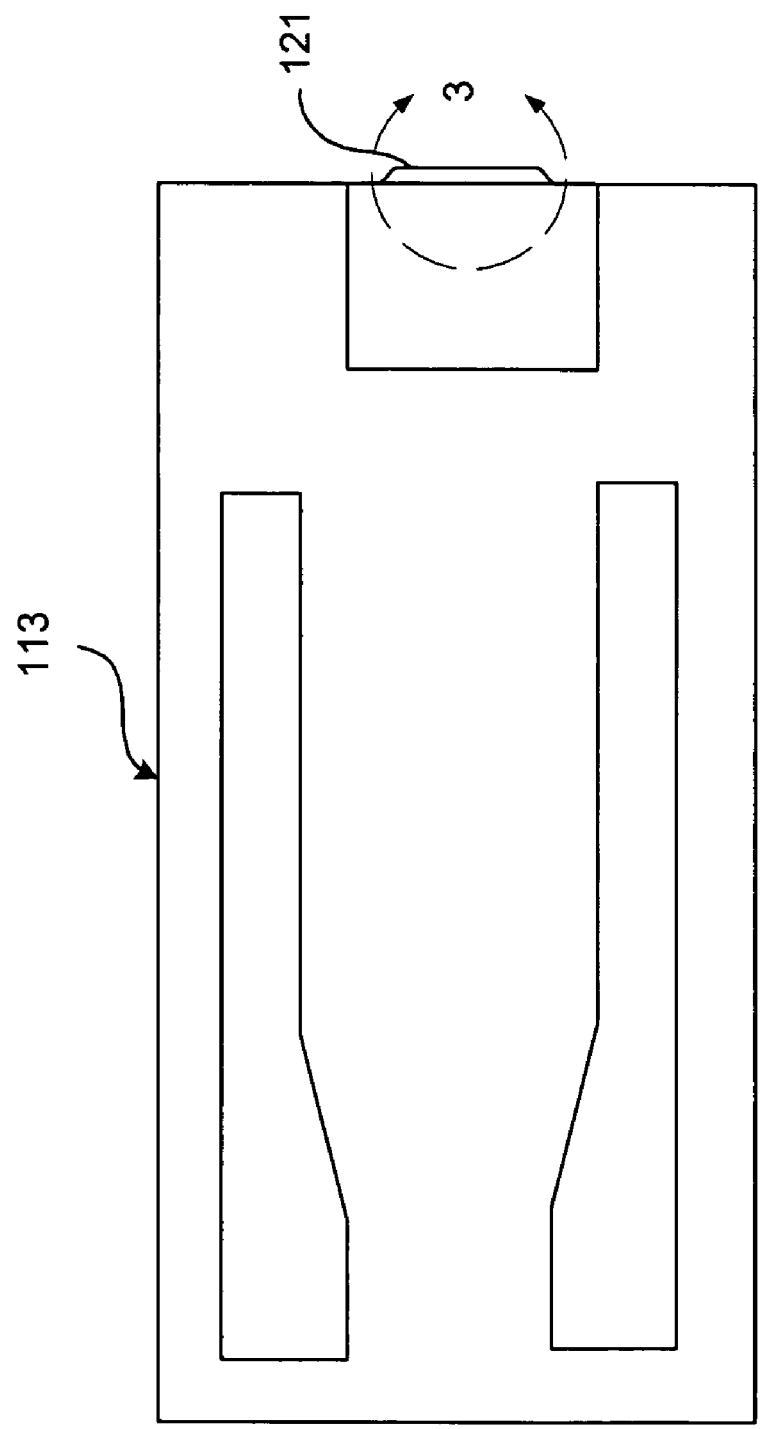
FIG. 2 is an ABS view of a slider, taken from line 3-3 of FIG. 2, illustrating the location of a magnetic head thereon.
Figure 3:
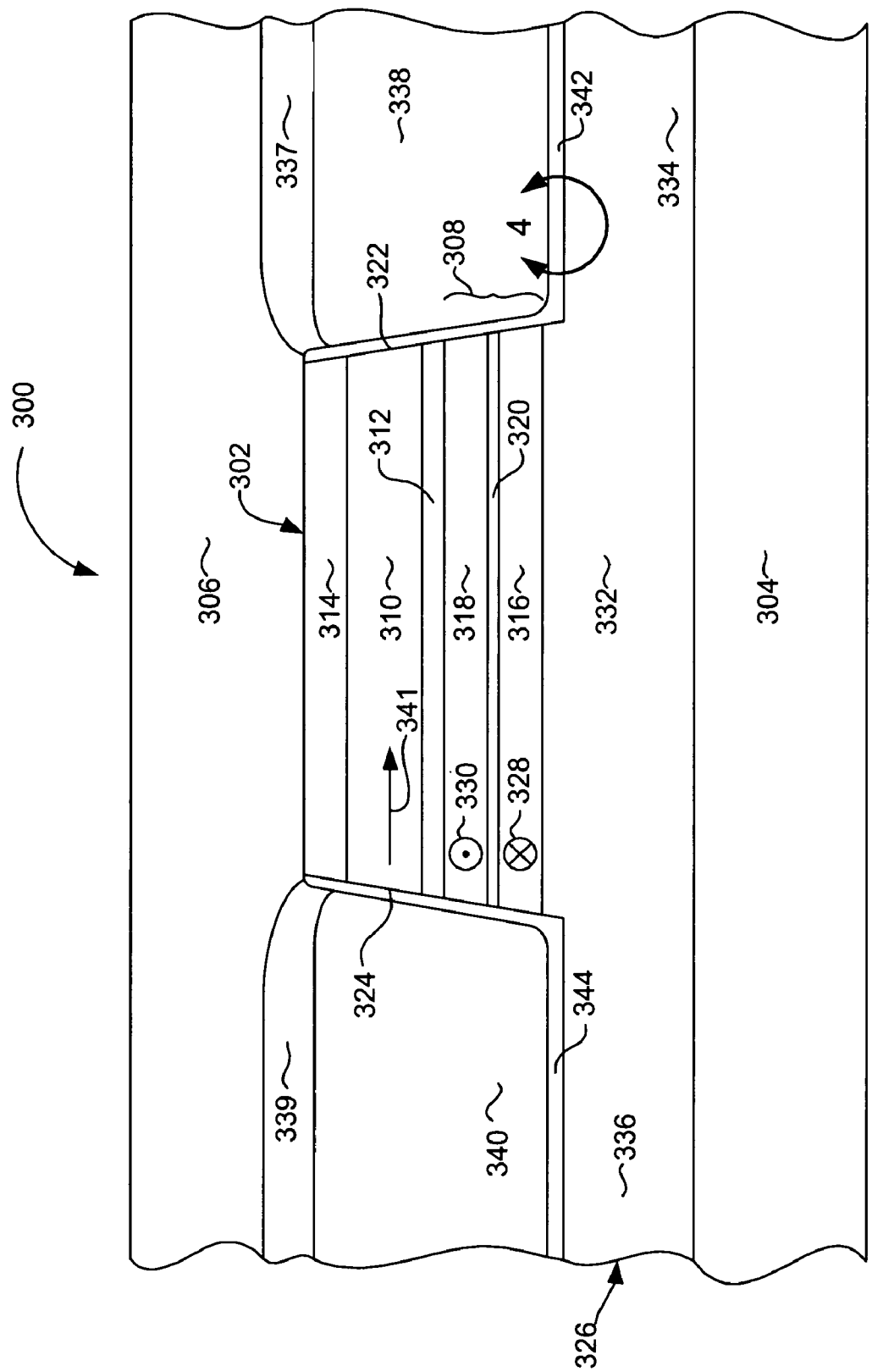
FIG. 3 is an ABS view of a magnetic sensor according to an embodiment of the present invention taken from circle 3 of FIG. 2.

With reference to FIG. 2, the orientation of the magnetic head 121 in a slider 113 can be seen in more detail. FIG. 3 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

With reference now to FIG. 3, a magnetoresistive sensor 300 according to an embodiment of the invention includes sensor stack 302 sandwiched between first and second gap layers 304, 306. The sensor stack 302 includes a magnetic pinned layer structure 308 and a magnetic free layer 310. A non-magnetic, electrically conductive spacer layer 312, such as Cu, is sandwiched between the free layer 310 and the pinned layer structure 308. A capping layer 314, such as Ta, may be provided at the top of the sensor stack 302 to protect the sensor from damage during manufacturing, such as from corrosion during subsequent annealing processes.

The pinned layer 308 can be a simple pinned structure or an antiparallel (AP) pinned structure and is preferably an AP pinned structure including first and second magnetic layers (AP1) 316, and (AP2) 318 which may be for example CoFe antiparallel coupled across a thin AP coupling layer 320 such as Ru. The free layer 310 can be constructed of various magnetic materials such as NiFe or CoFe, and may include a layers of CoFe and NiFe, preferably with a layer of CoFe or Co adjacent to the spacer 312 for optimal sensor performance.

As can be seen with reference to FIG. 3, the sensor stack 302 has first and second laterally opposed side walls 322, 324 that define the track-width or active area of the sensor. A layer of antiferromagnetic material (AFM) 326, preferably PtMn, formed at the bottom of the sensor stack 302 is exchange coupled with the AP1 layer 316. The AFM layer when exchange coupled with the AP1 layer 316 strongly pins the magnetic moment of the AP1 layer 316 as indicated by arrowhead 328. This in turn strongly pins the moment 330 of the AP2 layer 318 by antiparallel exchange coupling across the AP coupling layer 320. Also as can be seen, the AFM layer 326 has a portion 332 that is disposed within the track width or active area of the sensor 300, but also has first and second laterally extending portions 334, 336 that extend laterally outward beyond the active area of the sensor 300. The laterally extending portions 334, 336 may be slightly thinner than the inner portion 332 due to a partial milling process used to construct the sensor 300. It should be pointed out other sensor layers, such as the pinned layer 308 or spacer 312 could also extend beyond the active area of the sensor 300 as well. The extension of the AFM layer 326 alone is by way of example only.

With continued reference to FIG. 3, the sensor 300 includes first and second hard magnetic, bias layers (HB layers) 338, 340. In addition, first and second leads 337, 339 are formed over the HB layers 338, 340. The leads 337, 339 may be constructed of, for example, Ta, Au, Rh or some other electrically conducting material.

The HB layers 338, 340 are preferably constructed of an alloy consisting of Co and Pt. Preferably, the HB layers 338, 340 have 5 to 30 atomic percent Pt, although this is not a requirement to practice the present invention. Seed layers 342, 344 are provided beneath the HB layers 338, 340. The seed layers 342, 344 preferably extend over the laterally extending portions 334, 336 of the AFM layer as well as over the side walls 322, 324 of the sensor stack 302.

Figure 4:
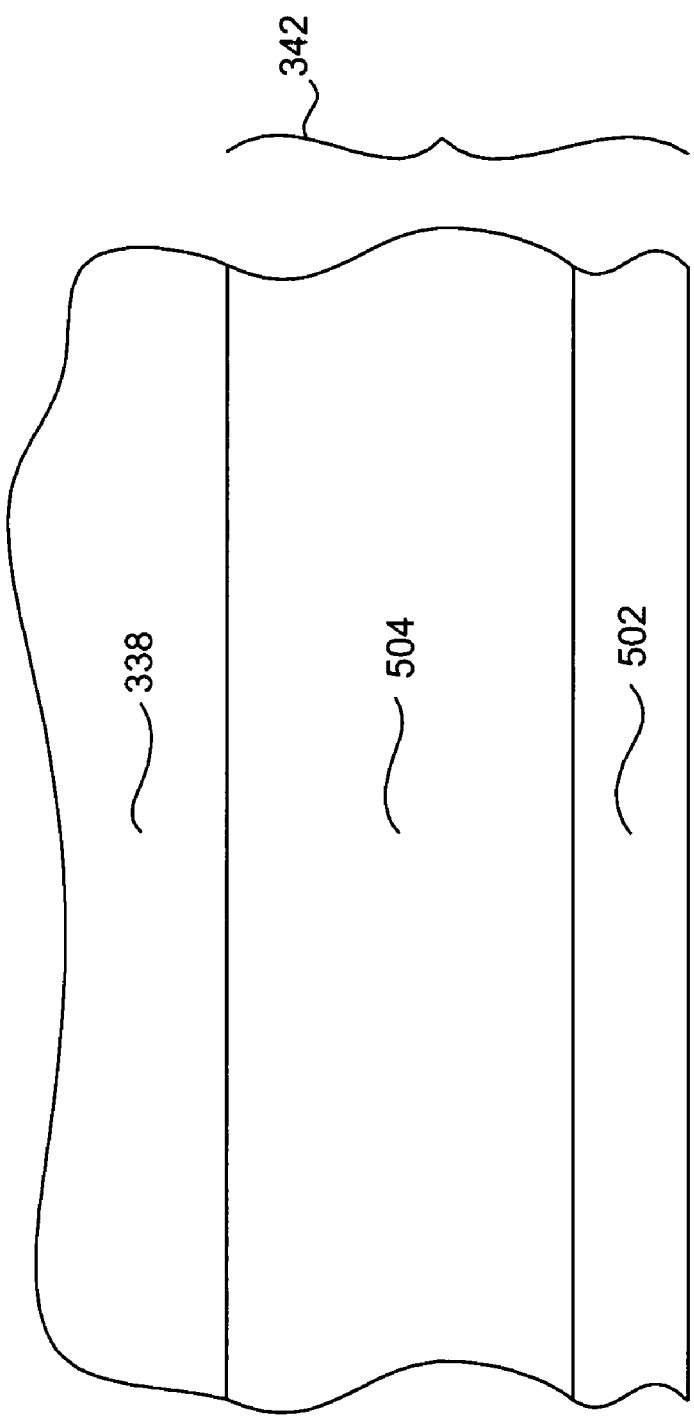
FIG. 4 is an enlarged view taken from circle 4 of FIG. 3 illustrating a seed layer structure according to an embodiment of the invention.

With reference to FIG. 4, the seed layers 342, 344 are constructed of a layer of NiTa 402 and a layer of CrMo 404 deposited over the layer of NiTa. Alternatively, with reference to FIG. 5, the seed layer can be a tri-layer structure having a layer of NiTa 502 sandwiched between first and second layers of CrMo 504, 506. As seen in FIG. 3, the seed layers extend up the sides 322, 324 of the sensor stack 302. Therefore, the thickness of the seed layers 342, 344 determines the separation between the HB layers 338, 340 and the free layer 310.

The magnetic moment from the hard bias layers 338, 340 biases the magnetic moment 341 of the free layer 310 by magnetostatic coupling across the seed layers 342, 344. However, the biasing provided by the HB layers 338, 340 due to this magnetostatic coupling, drops off by approximately a power of 2 with increasing spacing between HB layers 338, 340 and the free layer 310. Therefore, constructing the sensor 300 with thinner seed layers 342, 344 is critical to free layer biasing.

Figure 5:
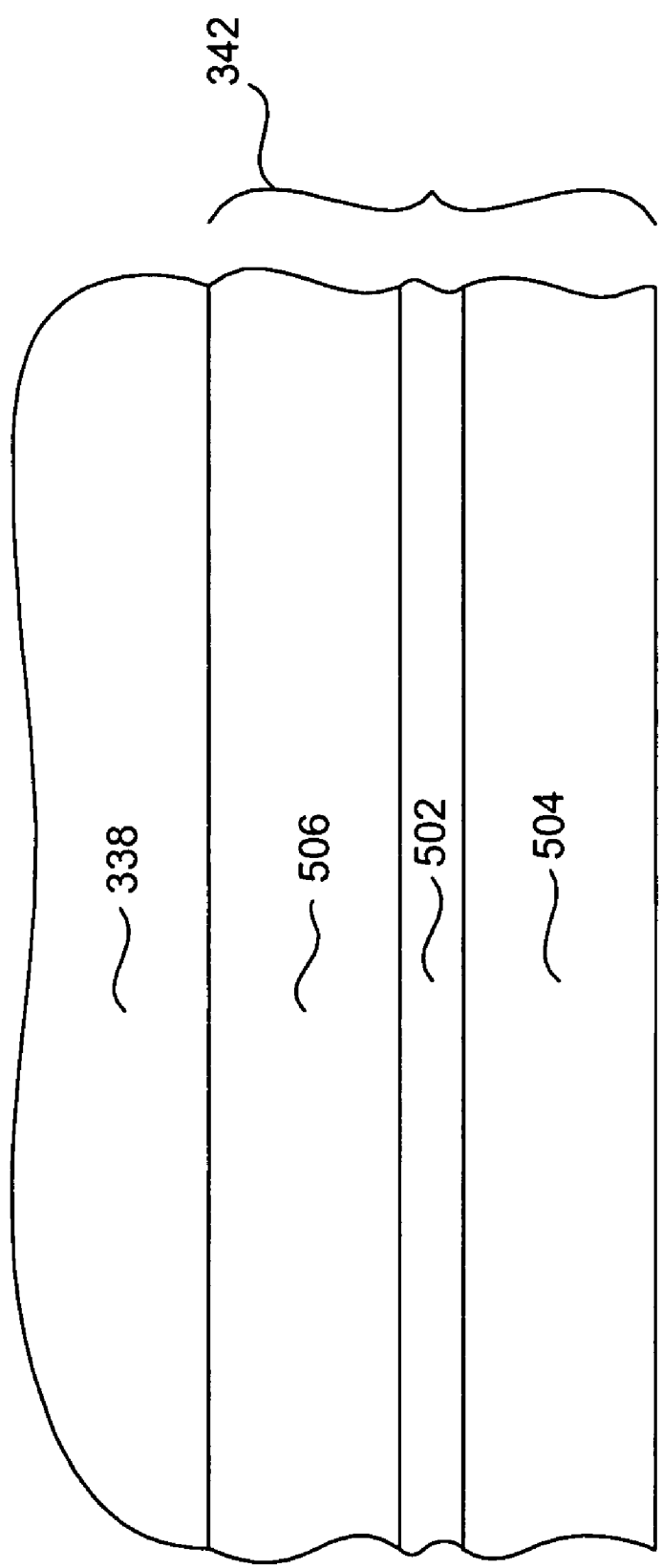
FIG. 5 is a view similar to that of FIG. 4 illustrating a seed layer according to another embodiment of the invention.

With continued reference to FIGS. 3, 4, and 5, the above described combination of HB layers 338, 340 and seed layers 342, 344 provide greatly improved free layer biasing in several ways. First, we have found that the CoPt HB layer 338, 340 deposited over the above described seed layer structure 342, 344 provides greatly improved magnetic moment and squareness over prior art hard bias structures. In fact we have found that the above described HB 338, 340 and seed structure 342, 344 have a coercivity of 2000 Oe or greater, which is a 30% increase over prior art structures.

In addition, the hard bias structure can be deposited over an amorphous structure as well as a crystalline structure, making it an excellent structure for use in a partial mill sensor design such as that described with reference to FIG. 3. The HB structure of the present invention exhibits high coercivity (Hc) with a squareness greater than 0.8 on both glass (amorphous) and crystalline structures.

Furthermore, the CoPt HB layers 338, 340 allow the use of a much thinner seed layer than was previously possible, greatly increasing magnetostatic coupling between the HB layers 338, 340 and the free layer 310. With reference to FIG. 4, the seed layer structure includes a layer of NiTa 502 which can be 5 to 50 Angstroms or about 10 Angstroms. The CrMo layer 504 is preferably 25 to 60 Angstroms and more preferably about 40 Angstroms. As can be seen, this results in a seed layer having at total thickness of about 50 Angstroms.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetoresistive sensor having a hard bias structure, the hard bias structure comprising:
   a seed layer structure; and
   a layer consisting essentially of CoPt deposited over the seed layer structure;
   wherein the seed layer structure comprises:
   a layer comprising NiTa; and
   a layer comprising CrMo deposited over the layer comprising NiTa.

2. A magnetoresistive sensor as in claim 1, wherein the seed layer structure further comprises:
   a layer of NiTa having a thickness of 5-50 Angstroms; and
   a layer comprising CrMo having a thickness of 25-60 Angstroms deposited over the layer comprising NiTa.

3. A magnetoresistive sensor as in claim 1, wherein the seed layer structure further comprises:
   a layer comprising NiTa having a thickness of about 10 Angstroms; and
   a layer comprising CrMo having a thickness of about 40 Angstroms deposited over the layer comprising NiTa.

4. A magnetoresistive sensor as in claim 1 wherein the seed layer structure comprises a layer comprising NiTa sandwiched between first and second layers each comprising CrMo.

5. A magnetorsistive sensor as in claim 4 wherein the first layer comprising CrMo has a thickness of 5-15 Angstroms, the layer comprising NiTa has a thickness of 5-50 Angstroms and the second layer comprising CrMo has a thickness of 25-60 Angstroms and is located adjacent to the layer consisting essentially of CoPt.

6. A magnetoresistive sensor as in claim 1 wherein the layer consisting essentially of CoPt has 5-30 atomic percent Pt.

7. A magnetoresistive sensor, comprising:
   a sensor stack including a magnetic free layer, the free layer terminating at first and second sides defining a sensor track width, a portion of the sensor stack extending beyond the track width of the sensor to form first and second laterally extending portions;
   first and second seed layer structures formed over each of the first and second laterally extending portions of the sensor stack and extending to the first and second sides of the free layer; and
   first and second layers comprising CoPt formed over the first and second seed layer structures;
   wherein each seed layer structure comprises a layer of NiTa and a layer of CrMo formed over the layer of NiTa.

8. A magnetorsistive sensor as in claim 7 wherein each of the laterally extending portions has a crystalline structure.

9. A magnetoresistive sensor as in claim 7, wherein each seed layer structure comprises a layer of NiTa having a thickness of 5-50 Angstroms and a layer of CrMo having a thickness of 25-60 Angstroms formed over the layer of NiTa.

10. A magnetoresistive sensor as in claim 7, wherein each seed layer structure comprises a layer of NiTa having a thickness of about 10 Angstroms and a layer of CrMo having a thickness of about 30 Angstroms formed over the layer of NiTa.

11. A magnetoresistive sensor as in claim 7 wherein the layer comprising CoPt has 5-30 atomic percent Pt.

12. A magnetoresistive sensor as in claim 7 wherein each seed layer structure comprises a layer of NiTa sandwiched between first and second layers of CrMo.

13. A magnetoresistive sensor as in claim 7 wherein each seed layer structure comprises a layer of NiTa sandwiched between first and second layers of CrMo, the first layer of CrMo having a thickness of 5-15 Angstroms, the NiTa layer having a thickness of 5-50 Angstroms, and the second layer of CrMo having a thickness of 25-60 Angstroms and being located adjacent to the layer comprising CoPt.

14. A magnetic data recording system, comprising:
   a magnetic medium;
   an actuator;
   a slider connected with the actuator for movement adjacent to a surface of the magnetic medium; and
   a magnetoresistive sensor connected with the slider, the magnetoresistive sensor including a hard bias structure comprising a seed layer structure and a layer consisting essentially of CoPt formed over the seed layer structure;
   wherein the seed layer structure includes a layer of NiTa and a layer of CrMo deposited over the layer of NiTa.

15. A magnetic data recording system as in claim 14, wherein the seed layer structure includes a layer of NiTa having a thickness of 5-50 Angstroms and a layer of CrMo having a thickness of 25-60 Angstroms deposited over the layer of NiTa.

16. A magnetic data recording system as in clam 14 wherein the seed layer structure comprises a layer of NiTa sandwiched between first and second layers of CrMo, the first layer or CrMo having a thickness of 5-15 Angstroms, the layer of NiTa having a thickness of 5-50 Angstroms, and the second layer of CrMo having a thickness of 25-60 Angstroms and being located adjacent to the layer consisting essentially of CoPt.

17. A magnetic data recording system as in claim 14 wherein the layer consisting essentially of CoPt has 5-30 atomic percent Pt.

* * * * *